US012287947B2

United States Patent
Wu et al.

(10) Patent No.: US 12,287,947 B2
(45) Date of Patent: Apr. 29, 2025

(54) METHOD AND APPARATUS FOR DETERMINING MULTIMEDIA EDITING INFORMATION, DEVICE AND STORAGE MEDIUM

(71) Applicant: BEIJING BAIDU NETCOM SCIENCE TECHNOLOGY CO., LTD., Beijing (CN)

(72) Inventors: Tong Wu, Beijing (CN); Wei Yang, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 179 days.

(21) Appl. No.: 18/059,542

(22) Filed: Nov. 29, 2022

(65) Prior Publication Data

US 2023/0085665 A1 Mar. 23, 2023

(30) Foreign Application Priority Data

Dec. 23, 2021 (CN) .......................... 202111594270.6

(51) Int. Cl.
   *G09G 5/00* (2006.01)
   *G06F 3/0481* (2022.01)
   (Continued)

(52) U.S. Cl.
   CPC ............ *G06F 3/0481* (2013.01); *G11B 27/10* (2013.01); *H04N 21/47217* (2013.01)

(58) Field of Classification Search
   CPC ......... G06T 11/60; G06T 19/00; G06T 11/00; G06T 11/20; G06T 11/206; G06F 9/4443;
   (Continued)

(56) References Cited

U.S. PATENT DOCUMENTS 8,208,067 B1 * 6/2012 Singh .................. G11B 27/005
                                                                345/475
2012/0007886 A1 * 1/2012 Nakamura ........... G11B 27/005
                                                                345/633
2017/0345458 A1 * 11/2017 Berglund ........... G11B 27/3081

FOREIGN PATENT DOCUMENTS

| CN | 1615659 A | 5/2005 |
| CN | 106454417 A | 2/2017 |

(Continued)

OTHER PUBLICATIONS

CNIPA, First Office Action for CN Application No. 202111594270.6, May 24, 2023.

*Primary Examiner* — Gordon G Liu
(74) *Attorney, Agent, or Firm* — Hodgson Russ LLP

(57) ABSTRACT

A method for determining multimedia editing information includes: obtaining a first playback time of a first target frame in first multimedia data to be edited, a second playback time of the first target frame for second multimedia data after editing and a playback multi-times speed set for the first multimedia data; determining, based on the first playback time and the second playback time, a time deviation that occurs while editing the first multimedia data at the playback multi-times speed for the first multimedia data; and determining, based on the time deviation, the first playback time, the second playback time and the playback multi-times speed, a playback time of the first multimedia data corresponding to each playback time of the second multimedia data after the second playback time.

17 Claims, 3 Drawing Sheets

(51) Int. Cl.
*G11B 27/10* (2006.01)
*H04N 21/472* (2011.01)

(58) Field of Classification Search
CPC .... G06F 3/0481; G06F 30/13; G06F 3/04845; G06F 3/04883; G06F 40/143; G06F 16/54; G06F 16/56; G06F 16/5838; G06V 20/20; G11B 27/10; H04N 21/47217
USPC .......................................................... 345/619
See application file for complete search history.

(56) References Cited

FOREIGN PATENT DOCUMENTS

| | | |
|---|---|---|
| CN | 107087214 A | 8/2017 |
| CN | 109996117 A | 7/2019 |
| CN | 110278450 A | 9/2019 |
| CN | 110430450 A | 11/2019 |
| JP | 2000332709 A | 11/2000 |

\* cited by examiner

… (1)

METHOD AND APPARATUS FOR DETERMINING MULTIMEDIA EDITING INFORMATION, DEVICE AND STORAGE MEDIUM

CROSS REFERENCE TO RELATED APPLICATIONS

This application claims priority to Chinese Application No. 202111594270.6, filed on Dec. 23, 2021, the entire disclosure of which is incorporated herein by reference.

TECHNICAL FIELD

The disclosure relates to a field of data processing technologies, in particular to fields of audio and video processing technologies and cloud service technologies.

BACKGROUND

In multimedia application scenarios such as audio and video, a user may need to edit multimedia data, for example, to clip, splice and set a multiplier speed for playing individual multimedia data, and generate new multimedia data. After setting the playback multi-times speed for playing the multimedia data, the data at each playback time of the newly generated multimedia data after the editing should correspond to the multimedia data before the editing according to the playback multi-times speed, so that multimedia editing information needs to be determined according to the playback multi-times speed to ensure that the newly generated multimedia data after the editing is accurate.

SUMMARY

According to a first aspect of the disclosure, a method for determining multimedia editing information is provided. The method includes:
  obtaining a first playback time of a first target frame in first multimedia data to be edited, a second playback time of the first target frame in second multimedia data after editing and a playback multi-times speed set for the first multimedia data, in which the first target frame is a frame of the first multimedia data that firstly appears in the second multimedia data;
  determining, for the first multimedia data based on the first playback time and the second playback time, a time deviation that occurs while editing the first multimedia data at the playback multi-times speed; and
  determining for playback times of the second multimedia data after the second playback time, respective playback times of first multimedia data, based on the time deviation, the first playback time, the second playback time and the playback multi-times speed.

According to a second aspect of the disclosure, an electronic device is provided. The electronic device includes: at least one processor and a memory communicatively coupled to the at least one processor. The memory stores instructions executable by the at least one processor. When the instructions are executed by the at least one processor, the at least one processor is caused to implement the method for determining multimedia editing information.

According to a third aspect of the disclosure, a non-transitory computer-readable storage medium having computer instructions stored thereon is provided. The computer instructions are configured to cause a computer to implement the method for determining multimedia editing information.

It is understandable that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

The application scenarios of the technical solution according to embodiments of the disclosure are described below.

The technical solution according to embodiments of the disclosure can be applied in scenarios where the multimedia data is edited using multimedia editing tools. The multimedia data may be video or audio.

In the process of editing the multimedia data using a multimedia editing tool, the user can drag the multimedia data into an editing track of the multimedia editing tool, such that editing operations such as clipping, stitching, and setting a playback multi-times speed can be performed on the multimedia data in the editing track, and then a correspondence between the playback time (also called playback moment) on the editing track and the playback time of the multimedia data is adjusted. The correspondence can be called multimedia editing information of the multimedia data.

The method for determining multimedia editing information according to the embodiments of the disclosure will be described below.

According to the technical solution of embodiments of the disclosure, in editing the first multimedia data, if the playback multi-times speed is set for the first multimedia data, correspondence between the playback time of the first multimedia data and the playback time of the second multimedia data after the second playback time is not directly determined based on the playback multi-times speed. Instead, the playback time of the first multimedia data is determined, based on the time deviation, the first playback time, the second playback time, and the playback multi-times speed, to correspond to each playback time of the second multimedia data after the second playback time, as the playback time of the first multimedia data corresponding to the playback time of the second multimedia data after the second playback time. Therefore, the accuracy of the correspondences between each playback time of the second multimedia data after the second playback time and the playback time of the first multimedia data is improved efficiently.

Figure 1:
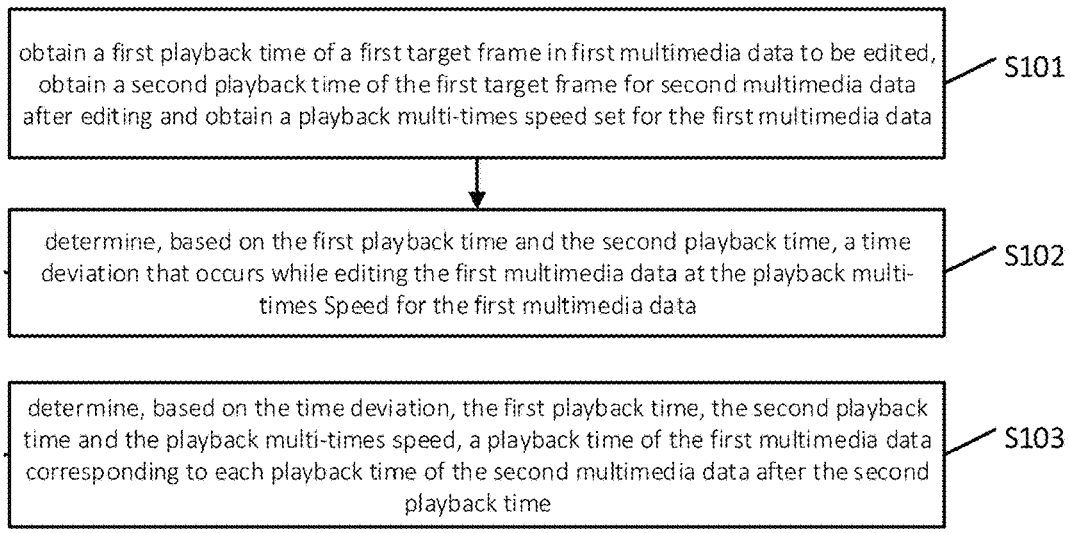
FIG. 1 is a flowchart illustrating a first method for determining multimedia editing information according to embodiments of the disclosure.

FIG. 1 is a flowchart illustrating a first method for determining multimedia editing information according to embodiments of the disclosure. As illustrated in FIG. 1, the method includes the following.

At block S101, a first playback time of a first target frame in first multimedia data to be edited is obtained, a second playback time of the first target frame is obtained for second multimedia data, and a playback multi-times speed set for the first multimedia data is obtained.

The first target frame is a first one of frames of the first multimedia data that appear in the second multimedia data. That is, the first target frame is a frame of the first multimedia data and the time when other frames of the first multimedia data appear in the second multimedia data is later than the time when that frame appears in the second multimedia data. This first target frame may be a first one of frames contained in the first multimedia data or any data frame included in the first multimedia data after the first one.

Since the first target frame is a first one of frames of the first multimedia data that appear in the second multimedia data, the second playback time indicates a moment that the first multimedia data starts to appear in the second multimedia data.

For example, if the first playback time of the first target frame in the first multimedia data is the $30^{th}$ second, then the first target frame is a data frame played at the $30^{th}$ second of the first multimedia data, and the first one of data frames of the first multimedia data that appear in the second multimedia data is the data frame played at the 30th second of the first multimedia data. If the second playback time of the first target frame in the second multimedia data is the 60th second, then the appearing of first multimedia data starts at the $60^{th}$ second of the second multimedia data.

The playback multi-times speed set for the first multimedia data is the times of the playback speed of the first multimedia data higher than the regular playback speed. For example, the playback speed set for the first multimedia data may be 0.5 times, 1.5 times or 2 times of the regular playback speed.

The first playback time, the second playback time and the playback multi-times speed can be set by the user. For example, the user can set the first playback time by dragging a playback progress bar on an interface area where the first multimedia data is played by adopting the multimedia editing tool. Moreover, the user can set the second playback time by dragging the playback progress bar of the editing track by adopting the multimedia editing tool. Furthermore, the user can set the above-mentioned playback multi-times speed by entering a value in a setting text box used for setting the multi-times speed by adopting the multimedia editing tool.

At block S102, based on the first playback time and the second playback time, a time deviation that occurs while editing the first multimedia data at the playback multi-times speed is determined for the first multimedia data.

Since the first target frame of the first multimedia data that first appears in the second multimedia data may not be a first one of frames included in the first multimedia data, the time deviation can occur for the first multimedia data while the first multimedia data is being edited. Since the playback multi-times speed has an effect on the change of the playback progress or playback time of the first multimedia data, it is necessary to determine the time deviation that will occur to the first multimedia data at the above playback multi-times speed.

In one case, the above time deviation can be understood as the playback time of the first multimedia data corresponding to the $0^{th}$ second of the second multimedia data. The calculation method of the time deviation in this case will be described in subsequent embodiments and thus not be described in detail here.

At block S103, based on the time deviation, the first playback time, the second playback time and the playback multi-times speed, a playback time of the first multimedia data is determined for each playback time of the second multimedia data after the second playback time.

In some embodiments, the implementation of determining the playback time of the first multimedia data corresponding to each playback time of the second multimedia data after the second playback time will be described in subsequent embodiments, which will not be detailed here.

Other implementations of determining the playback time of the first multimedia data corresponding to each playback time of the second multimedia data after the second playback time will be described at blocks S303-S304 in the subsequent embodiment illustrated in FIG. 3, which is not detailed here.

After determining the playback time of the first multimedia data for each playback time of the second multimedia data after the second playback time, in one implementation, the correspondence between the playback time of the first multimedia data and the playback time of the second multimedia data can be stored solidly, so that when the first multimedia data is being edited, there is no need to repeatedly determine the above-mentioned correspondence and the playback time can be read directly from the stored data.

As can be seen from the above, in the technical solution according to embodiments of the disclosure, in the process of editing the first multimedia data, if the playback multi-times speed is set for the first multimedia data, the correspondence between the playback time of the first multimedia data and the playback time of the second multimedia data after the second playback time is not directly determined based on the playback multi-times speed. Instead, the playback time of the first multimedia data is determined, based on the time deviation, the first playback time, the second playback time, and the playback multi-times speed, for each playback time of the second multimedia data after the second playback time, as the playback time of the first multimedia data corresponding to the playback time of the second multimedia data after the second playback time. Therefore, the accuracy of the correspondence between each playback time of the second multimedia data after the second playback time and the playback time of the first multimedia data is improved efficiently.

The calculation of the above time deviation is described below.

The time deviation that occurs while editing the first multimedia data at the playback multi-times speed is determined for the first multimedia data according to the following expression:

$$deviation=time1-speed \times time2$$

where time1 represents the first playback time, time2 represents the second playback time and speed represents the playback multi-times speed.

After obtaining the first playback time, the second playback time and the playback multi-times speed set for the first multimedia data, the above time deviation can be determined accurately and quickly.

In detail, the meaning of the above time deviation is described below in the following two cases.

In the first case, when the value of the above time deviation is negative, it means that there is no frame of the first multimedia data corresponding to the $0^{th}$ second of the second multimedia data.

For example, the first playback time is the $30^{th}$ second, the second playback time is the $60^{th}$ second, and the playback multi-times speed set for the first multimedia data is 2. Therefore, the above time deviation is $30-2 \times 60=-90$ seconds, which means that there is no frame of the first multimedia data corresponding to the $0^{th}$ second of the second multimedia data.

In the second case, when the value of the above time deviation is not negative, it means that there is a frame of the first multimedia data corresponding to the $0^{th}$ second of the second multimedia data. Therefore, the above time deviation is the playback time of the frame of the first multimedia data corresponding to the $0^{th}$ second of the second multimedia data.

For example, the first playback time is the $30^{th}$ second, the second playback time is the $10^{th}$ second, and the playback multi-times speed set for the first multimedia data is 2. Therefore, the above time deviation is $30-2 \times 10=10$ seconds, which means that the $0^{th}$ second of the second multimedia data corresponds to the $10^{th}$ second of the first multimedia data.

The implementation of determining the playback time of the first multimedia data corresponding to each playback time of the second multimedia data after the second playback time is described below.

The playback time (i.e., moment1) of the first multimedia data is determined for each playback time of the second multimedia data after the second playback time according to the following expression:

$$moment1=speed \times moment2+deviation$$

where moment2 represents the playback time of the second multimedia data after the second playback time.

In this way, the correspondence between the playback time of the second multimedia data after the second playback time and the playback time of the first multimedia data can be determined according to the above expression. Based on the above correspondence, the playback time of the first multimedia data corresponding to the playback time of the second multimedia data after the second playback time can be determined.

Since the expression describes the correspondence between the playback time of the second multimedia data after the second playback time and the playback time of the first multimedia data, the playback time of the first multimedia data can be determined for each playback time of the second multimedia data after the second playback time based on the correspondence, thereby making it easier and more efficient to obtain the playback time.

After determining the playback time of the first multimedia data corresponding to each playback time of the second multimedia data after the second playback time, a respective editing frame can be determined from the first multimedia data based on each determined playback time of the first multimedia data corresponding to each playback time of the second multimedia data, and the second multimedia data is generated based on the determined editing frames.

For the playback time of the first multimedia data corresponding to each playback time of the second multimedia data after the second playback time, the above-mentioned editing frames refer to the data frames in the first multimedia data played at the above-determined playback times of the first multimedia data.

In detail, in the process of generating the second multimedia data based on the determined editing frames, the editing frames can be read from the first multimedia data, and the read editing frames and existing data frames that are used for generating the second multimedia data form the second multimedia data according to the order that the editing frames are in the first multimedia data.

Thus, according to the technical solution according to embodiments of the disclosure, the second multimedia data can be accurately generated after the first multimedia data is edited, so that the second multimedia data becomes an independent multimedia data, to facilitate subsequent preview, playback, storage, and even editing of the second multimedia data.

In some scenarios, errors can occur when the user manually sets the second playback time. In order to ensure that there is the data frame of the first multimedia data at the second playback time of the second multimedia data, for setting the second playback time, a first initial playback time and a first limit time are obtained, and then the second playback time is determined based on the first initial playback time and the first limit time, which may be described in the embodiments of FIG. 2 in detail.

Figure 2:
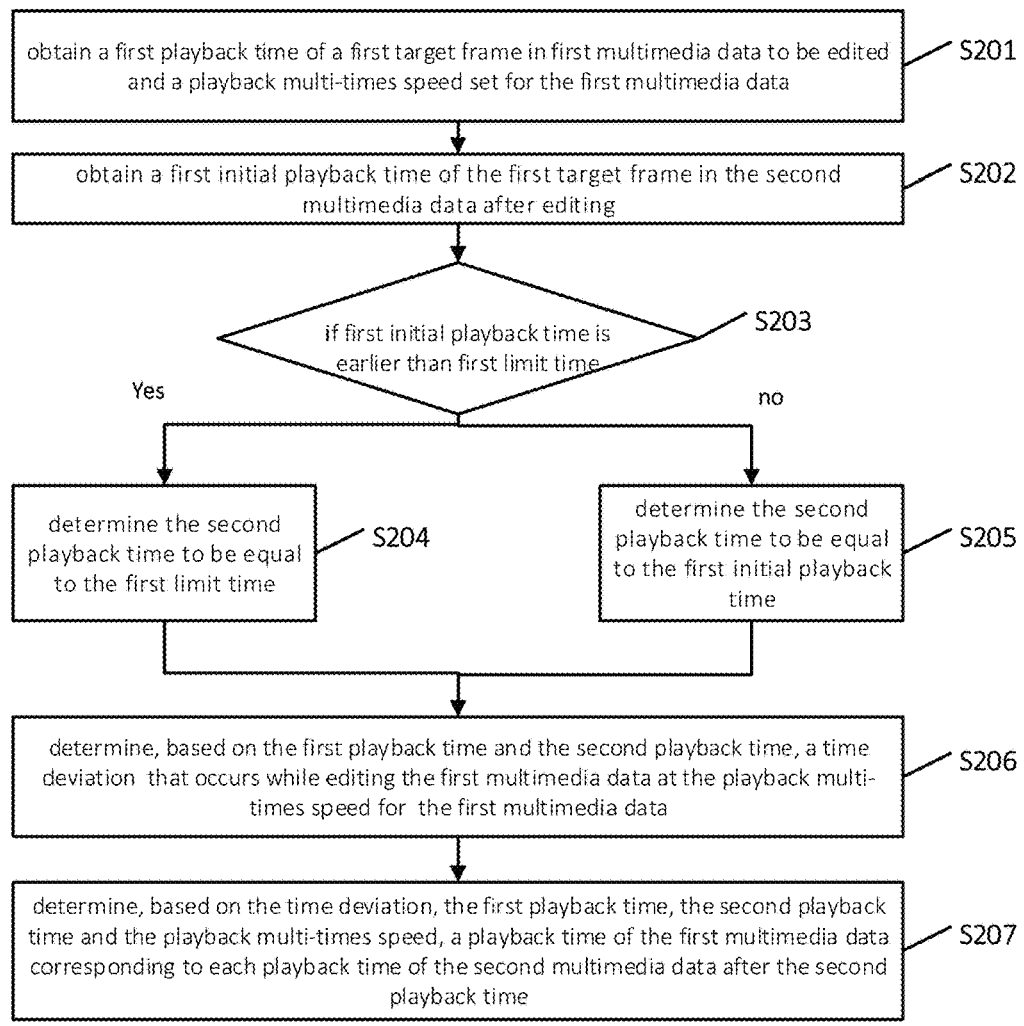
FIG. 2 is a flowchart illustrating a second method for determining multimedia editing information according to embodiments of the disclosure.

FIG. 2 is a flowchart illustrating a second method for determining multimedia editing information according to the embodiments of the disclosure. As illustrated in FIG. 2, the method includes the following.

At block S201, a first playback time of a first target frame in first multimedia data to be edited is obtained and a playback multi-timer speed set for the first multimedia data is obtained.

At this block, the manner of obtaining the first playback time and the playback multi-times speed is the same as that described in block S101 of the embodiment related to FIG. 1 above, and will not be repeated here.

At block S202, a first initial playback time of the first target frame is determined for the second multimedia data after editing.

For example, the first initial playback time can be obtained in the following manner.

In one implementation, the user may set the first initial playback time. For example, in a scenario using the multimedia editing tool, the user can set the first initial playback time by entering a value for the first initial playback time into a text box used to set the first initial playback time, or by dragging the playback progress bar of the editing track in the multimedia editing tool.

In another implementation, the user can set a playback time of a last frame in the second multimedia data and an appearing duration of the first multimedia data in the second multimedia data. Based on the playback time of the last frame in the second multimedia data and the appearing duration, the first initial playback time is calculated. The last frame is a last one of frames of the first multimedia data that appear in the second multimedia data. In other words, the time that other frames of the first multimedia data appear in the second multimedia data is earlier than the time that the last frame appears in the second multimedia data.

For example, if the user sets that the playback time of the last frame in the second multimedia data is the $90^{th}$ second and the appearing duration of the first multimedia data in the second multimedia data is 30 second, then the first initial playback time is the $60^{th}$ second (i.e., 90−30=60).

At block S203, it is determined whether the first initial playback time is earlier than the first limit time. In response to determining that the first initial playback time is earlier than the first limit time, the block S204 is executed, and in response to determining that the first initial playback time is no earlier than the first limit time, the block S205 is executed.

The first limit time is the playback time of a beginning frame of frames included in the first multimedia data in the second multimedia data. In other words, the first limit time is the playback time of a frame in the second multimedia data, where the frame is the same as the beginning frame of the first multimedia data.

The above-mentioned first target frame represents a first one of frames of the first multimedia data that appear in the second multimedia data, which can be any data frame of the first multimedia data. The beginning frame of the first multimedia data is the first one of frames contained in the first multimedia data, which is different from the first target frame.

Since the first limit time is the playback time of the beginning frame of the first multimedia data in the second multimedia data, there is no data frame of the first multimedia data corresponding to a playback time in the second multimedia data earlier than the first limit time. Thus, to ensure that there is a data frame of the first multimedia data corresponding to the second playback time, the first limit time is the earliest time that can be set for the second playback time. Therefore, in the process of determining the playback time of the first multimedia data corresponding to each playback time of the second multimedia data after the second playing time, it is necessary to determine whether the first initial playback time is earlier than the first limit time, that is, whether there is a data frame of the first multimedia data corresponding to the first initial playback time in the second multimedia data.

In one implementation, the first limit time (i.e., limit1) can be calculated according to the expression:

limit1=time1−time2/speed where time1 represents the first playback time, time2 represents the second playback time, and speed represents the playback multi-times speed.

In this way, after obtaining the first playback time, the second playback time and the playback multi-times speed set for the first multimedia data, the first limit time can be calculated accurately and conveniently.

At block S204, the second playback time is set to be equal to the first limit time.

When the first initial playback time is earlier than the first limit time, since there is no data frame of the first multimedia data at the first initial playback time, in order to ensure that the there is a data frame of the first multimedia data corresponding to the second playback time, the second playback time can be set to equal to the first limit time.

At block S205, the second playback time is set to be equal to the first initial playback time.

When the first initial playback time is not earlier than the first limit time, since there is a data frame of the first multimedia data corresponding to the first initial playback time, the second playback time can be set to equal to the first initial playback time.

At block S206, based on the first playback time and the second playback time, a time deviation that occurs while editing the first multimedia data at the playback multi-times speed is determined for the first multimedia data.

At block S207, based on the time deviation, the first playback time, the second playback time and the playback multi-timer speed, a playback time of the first multimedia data is determined for each playback time of the second multimedia data after the second playback time.

The above blocks S206 and S207 are identical to blocks S102 and S103 in the embodiments related to FIG. 1 above respectively, and will not be repeated here.

As can be seen from the above, in the technical solution of this embodiment, the first limit time is determined and the second playback time is obtained based on the first limit time and the first initial playback time, to ensure that there is the data frame of the first multimedia data corresponding to the second playback time of the second multimedia data, thereby improving the validity of the second playback time, and improving the accuracy of the finally determined playback time of the first multimedia data corresponding to each playback time of the second multimedia data after the second playback time.

Determining, based on the time deviation, the first playback time, the second playback time and the playback multi-times speed, the playback time of the first multimedia data corresponding to each playback time of the second multimedia data after the second playback time in the above block S103 can also be achieved by the steps in the embodiment related to FIG. 3 below.

Figure 3:
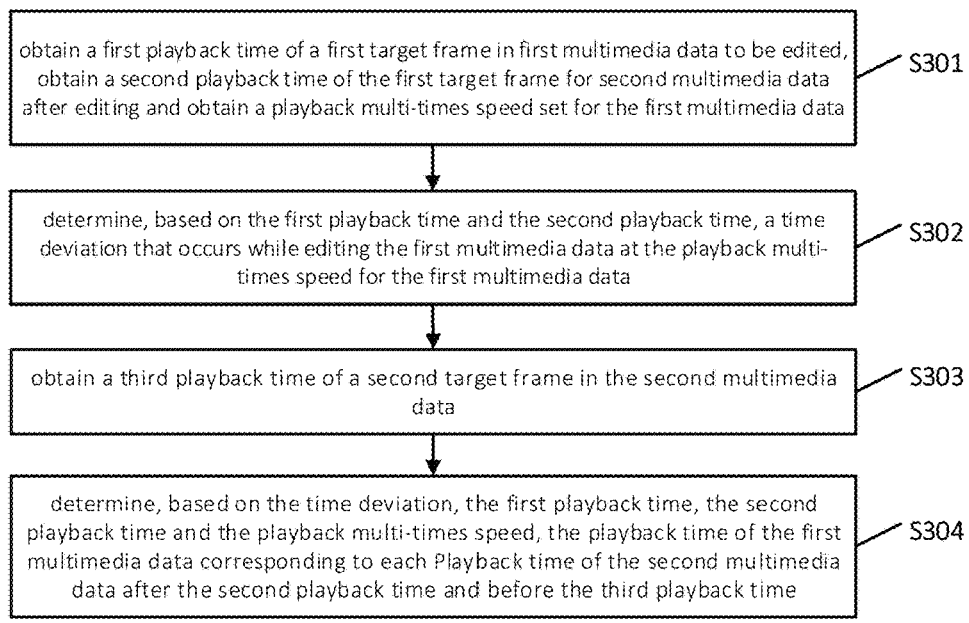
FIG. 3 is a flowchart illustrating a third method for determining multimedia editing information according to embodiments of the disclosure.

FIG. 3 is a flowchart illustrating a third method for determining multimedia editing information according to the embodiments of the disclosure. As illustrated in FIG. 3, the method includes the following.

At block S301, a first playback time of a first target frame in first multimedia data to be edited is obtained, a second playback time of the first target frame is obtained for second multimedia data after editing and a playback multi-times speed set for the first multimedia data is obtained.

At block S302, based on the first playback time and the second playback time, a time deviation that occurs while editing the first multimedia data at the playback multi-times speed is determined for the first multimedia data.

The above blocks S301 and S302 are identical to blocks S101 and S102 in the embodiments related to FIG. 1 above respectively, and will not be repeated here.

At block S303, a third playback time of a second target frame in the second multimedia data is obtained.

The second target frame is a last one of frames of the first multimedia data that appear in the second multimedia data.

The last frame has the same meaning as the end frame mentioned in the embodiment of block S202 related to FIG. 2 above, which represents a last one of frames of the first multimedia data that appear in the second multimedia data.

In detail, the third playback time of the second target frame in the second multimedia data can be obtained in the following ways.

In one implementation, the third playback time can be determined by the user, for example, in a scenario where the multimedia editing tool is used, the user can input a value of the third playback time in a text box used to set the third playback time, or drag the playback progress bar of the editing track in the multimedia editing tool to set the third playback time.

In another implementation, the appearing duration that the first multimedia data appears in the second multimedia data can be obtained, and the third playback time can be calculated according to the appearing duration and the second playback time.

For example, the second playback time is the $60^{th}$ second, the appearing duration that the first multimedia data appears in the second multimedia data is 30 seconds, and the third playback time is the $90^{th}$ second (i.e., 60+30=90).

At block S304, based on the time deviation, the first playback time, the second playback time and the playback multi-times speed, the playback time of the first multimedia data corresponding to each playback time of the second multimedia data after the second playback time and before the third playback time is determined.

This block can be implemented on the basis of the embodiment corresponding to block S103 in the embodiment related to FIG. 1, the difference lies only in determining the playback time of the first multimedia data for each playback time of the second multimedia data, which not only limits the playback time of the second multimedia data to be after the second playback time, but also before the third playback time.

As can be seen from the above, in the technical solution according to embodiments of the disclosure, the playback time of the first multimedia data is determined for each playback time of the second multimedia data after the second playback time and before the third playback time, which reduces a time range of the playback time in the second multimedia data that need to be determined according to the correspondence and effectively reduces the computing amount.

In addition, in the scenario of editing multimedia data using the multimedia editing tool, when the user drags the playback progress bar of the editing track in the multimedia editing tool, according to the technical solution according to the disclosure, the correspondence between the playback time of the first multimedia data (i.e., the first playback time) and the second multimedia data at various playback multi-times speeds can also be directly determined based on the playback time of the second multimedia data in the playback progress bar (i.e., the second playback time), which improves the compatibility of the dragging the playback progress bar at different playback multi-times speeds.

In some scenarios, in the process of setting the third playback time by the user, there may be some errors. In order to ensure that there is a data frame of the first multimedia data corresponding to the third playback time of the second multimedia data, for obtaining the third playback time, a second initial playback time and a second limit time are obtained, and the third playback time is determined based on the second initial playback time and the second limit time, which may be described in the embodiment related to FIG. 4 in detail.

Figure 4:
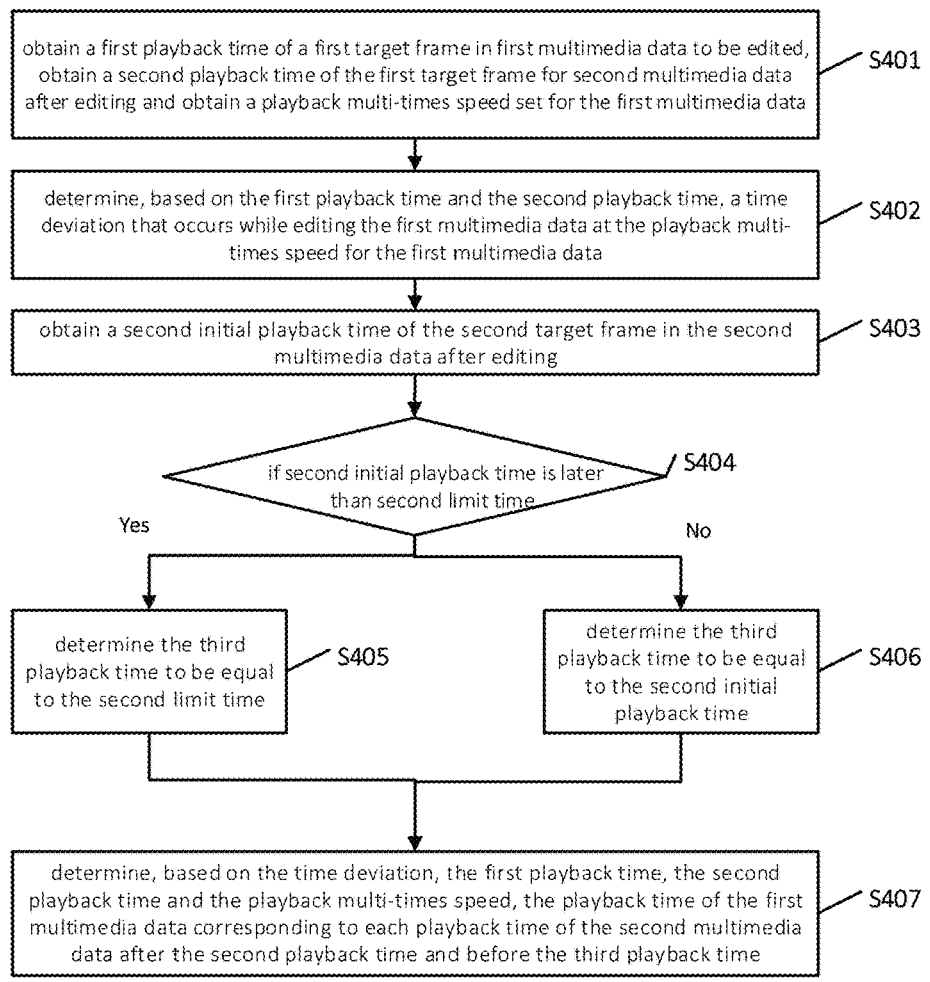
FIG. 4 is a flowchart illustrating a fourth method for determining multimedia editing information according to embodiments of the disclosure.

FIG. 4 is a flowchart illustrating a fourth method for determining multimedia editing information according to the embodiments of the disclosure. As illustrated in FIG. 4, the above method includes the following.

At block S401, a first playback time of a first target frame in first multimedia data to be edited is obtained, a second playback time of the first target frame is obtained for second multimedia data after editing and a playback multi-times speed set for the first multimedia data is obtained.

At block S402, based on the first playback time and the second playback time, a time deviation that occurs while editing the first multimedia data at the playback multi-times speed is determined for the first multimedia data.

The above blocks S401 and S402 are identical to blocks S101 and S102 in the embodiments related to FIG. 1 above respectively, and will not be repeated here.

At block S403, a second initial playback time of the second target frame in the second multimedia data after editing is obtained.

The second initial playback time of the second target frame in the second multimedia data can be obtained by the following.

In one implementation, the second initial playback time can be set by the user, for example, in a scenario where the multimedia editing tool is used, the user can input the value of the second initial playback time in the text box used for setting the second initial playback time to set the second initial playback time, or drag the playback progress bar of the editing track in the multimedia editing tool to set the second initial playback time.

In another implementation, the appearing duration that the first multimedia data appears in the second multimedia data can be obtained, and the second initial playback time can be calculated according to the appearing duration and the second playback time.

For example, if the second playback time is the $60^{th}$ second, and the appearing duration that the first multimedia data appears in the second multimedia data is 30 seconds, the second initial playback time is the $90^{th}$ second (i.e., 60+30=90).

At block S404, it is determined whether the second initial playback time is later than a second limit time, in response to determining that the second initial playback time is later than the second limit time, the block S405 is executed, and in response to determining that the second initial playback time is no later than the second limit time, the block S406 is executed.

The second limit time is a playback time of an end frame of frames included in the first multimedia data.

The last frame referred to at the block S202 in the embodiment related to FIG. 2 and at the block S303 in the embodiment related to FIG. 3 is the last one of frames of the first multimedia data that appear in the second multimedia data, and the last frame can be any data frame of the first multimedia data. In order to differ from the last frame of blocks S202 and S303, the end frame of the first multimedia data mentioned here is the last one of frames included in the first multimedia data.

Since the second limit time is the playback time of the end frame of the first multimedia data in the second multimedia data, there is no data frame of the first multimedia data corresponding to a playback time of the second multimedia data later than the second limit time. Thus, in order to guarantee that there is a data frame of the first multimedia data corresponding to the third playback time, the second limit time is the latest time that can be set as the third playback time. Therefore, in the process of determining the playback time of the first multimedia data corresponding to each playback time of the second multimedia data after the second playback time and before the third playback time, it is determined whether the third initial playback time is later than the second limit time, that is, it is determined whether there is a data frame of the first multimedia data corresponding to the third initial playback time in the second multimedia data.

In detail, a fourth playback time of the second target frame in the first multimedia data to be edited can be obtained, a duration of the first multimedia data can be obtained, and the second limit time can be obtained based on the first playback time and the duration mentioned above.

The fourth playback time can be obtained in the following ways.

In an implementation, the appearing duration of the first multimedia data in the second multimedia data can be obtained, and the fourth playback time is calculated based on the first playback time, the playback multi-times speed set for the first multimedia data and the appearing duration.

For example, if the first playback time is the $30^{th}$ second, the playback multi-times speed set for the first multimedia data is 2, and the appearing duration of the first multimedia data in the second multimedia data is 30 seconds, then the fourth playback time is the $90^{th}$ second (i.e., 30+2×30=90).

After obtaining the fourth playback time of the second target frame in the first multimedia data and the duration of the first multimedia data, in an implementation, the second limit time (i.e., limit2) is calculated according to the following expression:

$$limit2=time3+(duration-time4)/speed$$

where time3 represents the third playback time, duration represents the duration of the first multimedia data, time4 represents the fourth playback time and speed represents the playback multi-times speed.

Thus, after obtaining the third playback time, the fourth playback time and the playback multi-times speed set for the first multimedia data, the second limit time can be calculated accurately and conveniently.

At block S405, the third playback time is set to be equal to the second limit time.

If the second initial playback time is later than the second limit time, since there is no data frame of the first multimedia data corresponding to the second initial playback time, in order to ensure that there is a data frame of the first multimedia data corresponding to the third playback time, the third playback time can be set to be equal to the second limit time.

At block S406, the third playback time is set to be equal to the second initial playback time.

If the second initial playback time is no later than the second limit time, since there is a data frame of the first multimedia data corresponding to the second initial playback time, the third playback time can be set to be equal to the second initial playback time.

At block S407, based on the time deviation, the first playback time, the second playback time and the playback multi-times speed, the playback time of the first multimedia data corresponding to each time in the second multimedia data after the second playback time and before the third playback time in the first multimedia data is determined.

The above block S407 is the same as block S304 shown in the preceding embodiment related to FIG. 3, and will not be repeated here.

As can be seen from the above, according to the technical solution of embodiments of the disclosure, the second limit time is determined and the third playback time is obtained based on the second limit time and the second initial playback time, which guarantees that the third playback time of the second multimedia data has a corresponding data frame of the first multimedia data, thereby improving the validity of the third playback time, and improving the accuracy of the finally determined playback time of the first multimedia data corresponding to each playback time of the second multimedia data after the second playback time and before the third playback time.

Corresponding to the method for determining multimedia editing information mentioned above, the disclosure also provides an apparatus for determining multimedia editing information.

Figure 5:
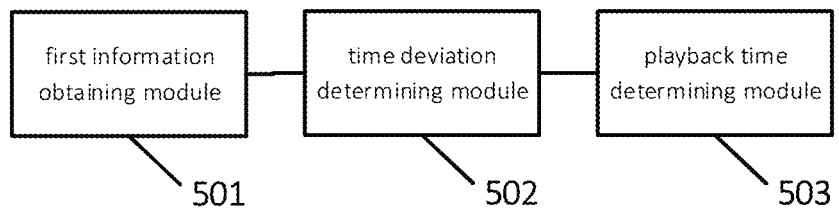
FIG. 5 is a schematic diagram illustrating a first apparatus for determining multimedia editing information according to embodiments of the disclosure.

As illustrated in FIG. 5, FIG. 5 is a schematic diagram illustrating a first apparatus for determining multimedia editing information according to embodiments of the disclosure. The apparatus includes: a first information obtaining module 501, a time deviation determining module 502, and a playback time determining module 503.

The first information obtaining module 501 is configured to obtain a first playback time of a first target frame in first multimedia data to be edited, a second playback time of the first target frame for second multimedia data after editing and a playback multi-times speed set for the first multimedia data, in which the first target frame is a first one of frames of the first multimedia data that appear in the second multimedia data.

The time deviation determining module 502 is configured to determine, based on the first playback time and the second playback time, a time deviation that occurs while editing the first multimedia data at the playback multi-times speed for the first multimedia data.

The playback time determining module 503 is configured to determine, based on the time deviation, the first playback time, the second playback time and the playback multi-times speed, a playback time of the first multimedia data corresponding to each playback time in the second multimedia data after the second playback time.

As can be seen from the above, in the solution of embodiments of the disclosure, in the process of editing the first multimedia data, the playback multi-times speed is set for the first multimedia data, the playback time of the first multimedia data corresponding to each playback time of the second multimedia data after the second playback time is not determined directly according to the playback multi-times speed. Instead, which frame of the first multimedia data corresponds to a current playback time of the second multimedia data after the second playback time can be determined based on the time deviation, the first playback time, the second playback time and the playback multi-times speed, as the playback time of the first multimedia data corresponding to the playback time of the second multimedia data after the second playback time, which effectively improves the accuracy of the correspondence between each playback time of the second multimedia data after the second playback time and the playback time of the first multimedia data.

In one implementation, the time deviation determining module is configured to determine the time deviation that occurs while editing the first multimedia data at the playback multi-times speed for the first multimedia data according to the following expression:

$$deviation = time1 - speed \times time2$$

where time1 represents the first playback time, time2 represents the second playback time, and speed represents the playback multi-times speed.

After obtaining the first playback time, the second playback time and the playback multi-times speed set for the first multimedia data, the time deviation can be determined accurately and quickly.

In one implementation, the playback time determining module is configured to determine the playback time (i.e., moment1) of the first multimedia data corresponding to each playback time of the second multimedia data after the second playback time according to the following expression:

$$moment1 = speed \times moment2 + deviation$$

where moment2 represents the playback time after the second playback time.

Since the above expression represents the correspondence between the playback time of the second multimedia data after the second playback time and the playback time of the first multimedia data, the playback time of the first multimedia data is obtained for each playback time of the second multimedia data after the second playback time based on the correspondence, which makes acquirement of the playback time more convenient and efficient.

Figure 6:
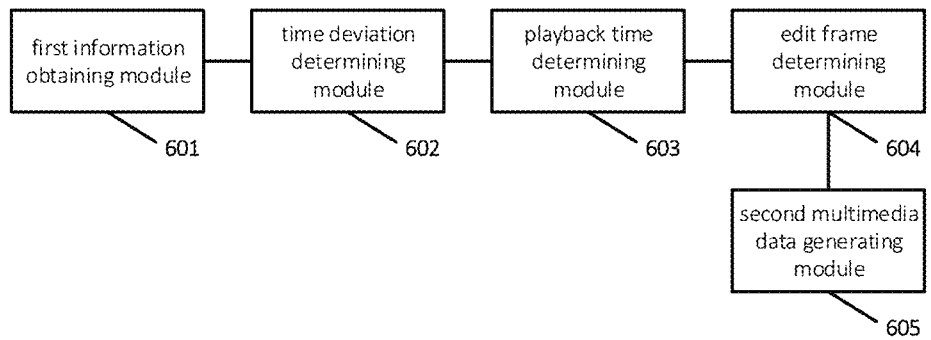
FIG. 6 is a schematic diagram illustrating a second apparatus for determining multimedia editing information according to embodiments of the disclosure.

FIG. 6 is a schematic diagram illustrating a second apparatus for determining multimedia editing information according to embodiments of the disclosure. As illustrated in FIG. 6, the apparatus includes: a first information obtaining module 601, a time deviation determining module 602, a playback time determining module 603, an editing frame determining module 604 and a second multimedia data generating module 605.

The first information obtaining module 601 is configured to obtain a first playback time of a first target frame in first multimedia data to be edited, obtain a second playback time of the first target frame for second multimedia data after editing and obtain a playback multi-times speed set for the first multimedia data. The first target frame is a first one of frames of the first multimedia data that appear in the second multimedia data.

The time deviation determining module 602 is configured to determine, based on the first playback time and the second playback time, a time deviation that occurs while editing the first multimedia data at the playback multi-times speed for the first multimedia data.

The playback time determining module 603 is configured to determine, based on the time deviation, the first playback time, the second playback time and the playback multi-times speed, a playback time of the first multimedia data corresponding to each playback time of the second multimedia data after the second playback time.

The editing frame determining module 604 is configured to determine, based on the determined playback time of the first multimedia data, editing frames corresponding to each playback time of the first multimedia data.

The second multimedia data generating module 605 is configured to generate, based on the determined editing frames, the second multimedia data.

As can be seen, based on the technical solution according to embodiments of the disclosure, the second multimedia data can be accurately generated after editing the first multimedia data, so that the second multimedia data becomes an independent multimedia data, which facilitates subsequent operations such as previewing, playing, storing and even editing on the second multimedia data.

In an implementation, obtaining the second playback time includes: obtaining a first initial playback time of the first target frame in the second multimedia data after editing; in response to the first initial playback time being earlier than a first limit time, determining the second playback time to be equal to the first limit time, in which the first limit time is a playback time of a beginning frame of the first multimedia data in the second multimedia data; and in response to the first initial playback time not being earlier than the first limit time, determining the second playback time to be equal to the first initial playback time.

As can be seen from the above, in the technical solution according to embodiments of the disclosure, the first limit time is determined and the second playback time is obtained based on the first limit time and the first initial playback time, thereby ensuring that there is a data frame of the first multimedia data corresponding to the second playback time of the second multimedia data. In this way, the validity of the second playback time is improved, and the accuracy of the finally determined playback time of the first multimedia data corresponding to each playback time of the second multimedia data after the second playback is also improved.

In one implementation, the first limit time, denoted by limit1, is calculated according to the following expression:

$$limit1 = time1 - time2 / speed$$

where time1 represents the first playback time, time2 represents the second playback time, and speed represents the playback multi-times speed.

In this way, after obtaining the first playback time, the second playback time and the playback multi-times speed set for the first multimedia data, the first limit time can be calculated accurately and conveniently.

Figure 7:
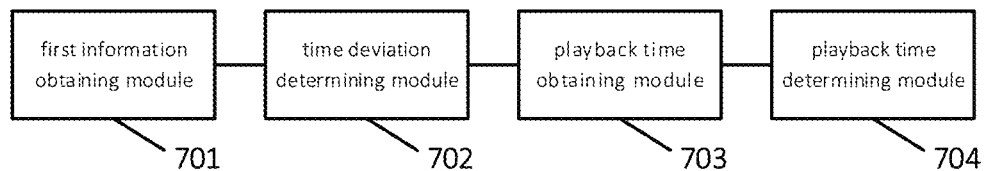
FIG. 7 is a schematic diagram illustrating a third apparatus for determining multimedia editing information according to embodiments of the disclosure.

FIG. 7 is a schematic diagram illustrating a third apparatus for determining multimedia editing information according to the embodiments of the disclosure. As illustrated in FIG. 7, the apparatus includes: a first information obtaining module 701, a time deviation determining module 702, a playback time obtaining module 703, and a playback time determining module 704.

The first information obtaining module 701 is configured to obtain a first playback time of a first target frame in first multimedia data to be edited, obtain a second playback time of the first target frame for second multimedia data after editing and obtain a playback multi-times speed set for the first multimedia data. The first target frame is a first one of frames of the first multimedia data that appears in the second multimedia data.

The time deviation determining module 702 is configured to determine, based on the first playback time and the second playback time, a time deviation that occurs while editing the first multimedia data at the playback multi-times speed for the first multimedia data.

The playback time obtaining module 703 is configured to obtain a third playback time of a second target frame in the second multimedia data. The second target frame is a last one of frames of the first multimedia data that appear in the second multimedia data.

The playback time determining module 704 is further configured to determine, based on the time deviation, the first playback time, the second playback time and the playback multi-times speed, the playback time of the first multimedia data corresponding to each playback time of the second multimedia data after the second playback time and before the third playback time.

As can be seen from the above, in the technical solution according to embodiments of the disclosure, the playback time of the first multimedia data corresponding to each playback time of the second multimedia data after the second playback time and before the third playback time is determined, which reduces a time range of the playback time of the second multimedia data that need to be determined according to the correspondence and effectively reduces the computing amount.

In addition, in a scenario where the multimedia data is edited using the multimedia editing tool, when the user drags a playback progress bar of the editing track in the multimedia editing tool, according to the technical solution according to the disclosure, the playback time of the first multimedia data (i.e., the first playback time) corresponding to the second playback time at various playback multi-times speeds can also be directly determined based on the playback time of the second multimedia data in the playback progress bar (i.e., the second playback time), which improves the compatibility of the user dragging the playback progress bar at different playback multi-times speeds.

In one implementation, the playback time obtaining module is configured to: obtain a second initial playback time of the second target frame in the second multimedia data after editing; in response to the second initial playback time being later than a second limit time, determine the third playback time to be equal to the second limit time, in which the second limit time is a playback time of an end frame of the first multimedia data in the second multimedia data; and in response to the second initial playback time not being later than the second limit time, determine the third playback time to be equal to the second initial playback time.

As can be seen from the above, in the technical solution according to embodiments of the disclosure, the first limit time is determined and the second playback time is obtained based on the first limit time and the first initial playback time, thereby ensuring that there is a data frame of the first multimedia data corresponding to the second playback time of the second multimedia data. In this way, the validity of the second playback time is improved, and the accuracy of the finally determined playback time of the first multimedia data corresponding to each playback time of the second multimedia data after the second playback time is also improved.

In one implementation, the apparatus further includes a second information obtaining module.

The second information obtaining module is configured to obtain a fourth playback time of the second target frame in the first multimedia data and a duration of the first multimedia data.

The second limit time, denoted by limit2, is calculated according to the following expression:

$$limit2 = time3 + (duration - time4)/speed$$

where time3 represents the third playback time, duration represents the duration of the first multimedia data, time4 represents the fourth playback time and speed represents the playback multi-times speed.

In this way, after obtaining the third playback time, the fourth playback time and the playback multi-times speed set for the first multimedia data, the second limit time can be calculated accurately and conveniently.

According to the embodiments of the disclosure, the disclosure also provides an electronic device, a readable storage medium, and a computer program product.

In an embodiment of the disclosure, an electronic device is provided. The electronic device includes: at least one processor and a memory communicatively coupled to the at least one processor. The memory stores instructions executable by the at least one processor, and when the instructions are executed by the at least one processor, the method for determining multimedia editing information according to the method embodiments is implemented.

In an embodiment of the disclosure, a non-transitory computer-readable storage medium having computer instructions stored thereon is provided. The computer instructions are used to cause the computer to implement the method for determining multimedia editing information described in the above method embodiments.

In an embodiment of the disclosure, a computer program product is provided. The computer program product includes computer programs, and when the computer programs are executed by a processor, the method for determining multimedia editing information described in the above method embodiments is implemented.

Figure 8:
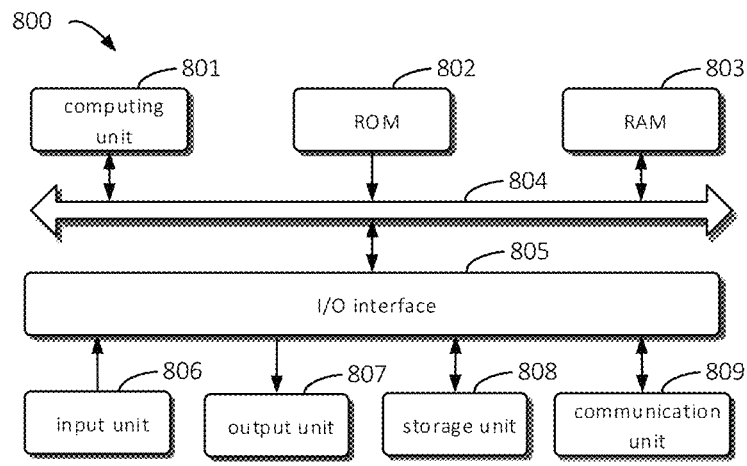
FIG. 8 is a block diagram illustrating an electronic device used to implement the method for determining multimedia editing information according to embodiments of the disclosure.

FIG. 8 is a block diagram of an example electronic device 800 used to implement the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 8, the device 800 includes a computing unit 801 performing various appropriate actions and processes based on computer programs stored in a Read-Only Memory (ROM) 802 or computer programs loaded from the storage unit 808 to a Random Access Memory (RAM) 803. In the RAM 803, various programs and data required for the operation of the device 800 are stored. The computing unit 801, the ROM 802, and the RAM 803 are connected to each other through a bus 804. An input/output (I/O) interface 805 is also connected to the bus 804.

Components in the device 800 are connected to the I/O interface 805, including: an inputting unit 806, such as a keyboard, a mouse; an outputting unit 807, such as various types of displays, speakers; a storage unit 808, such as a disk, an optical disk; and a communication unit 809, such as network cards, modems, and wireless communication transceivers. The communication unit 809 allows the device 800 to exchange information/data with other devices through a computer network such as the Internet and/or various telecommunication networks.

The computing unit 801 may be various general-purpose and/or dedicated processing components with processing and computing capabilities. Some examples of computing unit 801 include, but are not limited to, a Central Processing Unit (CPU), a Graphics Processing Unit (GPU), various dedicated AI computing chips, various computing units that run machine learning model algorithms, and a Digital Signal Processor (DSP), and any appropriate processor, controller and microcontroller. The computing unit 801 executes the various methods and processes described above, such as the method for determining multimedia editing information. For example, in some embodiments, the method may be implemented as a computer software program, which is tangibly contained in a machine-readable medium, such as the storage unit 808. In some embodiments, part or all of the computer program may be loaded and/or installed on the device 800 via the ROM 802 and/or the communication unit 809. When the computer program is loaded on the RAM 803 and executed by the computing unit 801, one or more steps of the method described above may be executed. Alternatively, in other embodiments, the computing unit 801 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System On Chip (SOCs), Complex Programmable Logic Device (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage medium include electrical connections based on one or more wires, portable computer disks, hard disks, RAMs, ROMs, Electrically Programmable Read-Only-Memory (EPROM), flash memories, fiber optics, Compact Disc Read-Only Memories (CD-ROMs), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: Local Area Network (LAN), Wide Area Network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, a server of a distributed system, or a server combined with a block-chain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for determining multimedia editing information, comprising:
    obtaining a first playback time of a first target frame in first multimedia data to be edited, obtaining a second playback time of the first target frame for second multimedia data after editing and obtaining a playback multi-times speed set for the first multimedia data, wherein the first target frame is a first one of frames of the first multimedia data that appear in the second multimedia data, and the playback multi-times speed is times of a playback speed of the first multimedia data higher than a regular playback speed;
    determining, based on the first playback time and the second playback time, a time deviation that occurs while editing the first multimedia data at the playback multi-times speed for the first multimedia data;
    obtaining a third playback time of a second target frame in the second multimedia data, wherein the second target frame is a last one of frames of the first multimedia data that appear the second multimedia data; and
    determining, based on the time deviation, the first playback time, the second playback time and the playback multi-times speed, a playback time of the first multimedia data corresponding to each playback time of the second multimedia data after the second playback time and before the third playback time.

2. The method of claim 1, further comprising:
determining, based on the determined playback time of the first multimedia data, editing frames corresponding to each playback time of the first multimedia data; and
generating, based on the determined editing frames, the second multimedia data.

3. The method of claim 1, wherein determining, based on the first playback time and the second playback time, the time deviation that occurs while editing the first multimedia data at the playback multi-times speed for the first multimedia data comprises:
determining the time deviation that occurs while editing the first multimedia data at the playback multi-times speed for the first multimedia data according to the following expression:

$$deviation = time1 - speed \times time2$$

where deviation represents the time deviation, time1 represents the first playback time, time2 represents the second playback time and speed represents the playback multi-times speed.

4. The method of claim 3, wherein determining, based on the time deviation, the first playback time, the second playback time and the playback multi-times speed, the playback time of the first multimedia data corresponding to each playback time of the second multimedia data after the second playback time comprises:
determining the playback time of the first multimedia data corresponding to each playback time of the second multimedia data after the second playback time according to the following expression:

$$moment1 = speed \times moment2 + deviation$$

where moment1 represents the playback time of the first multimedia data and moment2 represents the playback time after the second playback time.

5. The method of claim 1, wherein obtaining the second playback time comprises:
obtaining a first initial playback time of the first target frame in the second multimedia data after editing;
in response to the first initial playback time being earlier than a first limit time, determining the second playback time to be equal to the first limit time, wherein the first limit time is a playback time of a beginning frame of the first multimedia data in the second multimedia data; and
in response to the first initial playback time not being earlier than the first limit time, determining the second playback time to be equal to the first initial playback time.

6. The method of claim 5, wherein the first limit time is calculated according to the following expression:

$$limit1 = time1 - time2/speed$$

where limit1 represents the first limit time, time1 represents the first playback time, time2 represents the second playback time and speed represents the playback multi-times speed.

7. The method of claim 1, wherein obtaining the third playback time of the second target frame in the second multimedia data comprises:
obtaining a second initial playback time of the second target frame in the second multimedia data after editing;
in response to the second initial playback time being later than a second limit time, determining the third playback time to be equal to the second limit time, wherein the second limit time is a playback time of an end frame of the first multimedia data in the second multimedia data; and
in response to the second initial playback time not being later than the second limit time, determining the third playback time to be equal to the second initial playback time.

8. The method of claim 7, further comprising:
obtaining a fourth playback time of the second target frame in the first multimedia data and a duration of the first multimedia data; and
obtaining the second limit time according to the following expression:

$$limit2 = time3 + (duration - time4)/speed$$

where limit2 represents the second limit time, time3 represents the third playback time, duration represents the duration of the first multimedia data, time4 represents the fourth playback time and speed represents the playback multi-times speed.

9. An electronic device, comprising:
at least one processor; and
a memory communicatively coupled to the at least one processor;
wherein the memory stores instructions executable by the at least one processor, and when the instructions are executed by the at least one processor, the at least one processor is configured to:
obtain a first playback time of a first target frame in first multimedia data to be edited, obtain a second playback time of the first target frame for second multimedia data after editing and obtain a playback multi-times speed set for the first multimedia data, wherein the first target frame is a first one of frames of the first multimedia data that appear in the second multimedia data, and the playback multi-times speed is times of a playback speed of the first multimedia data higher than a regular playback speed;
determine, based on the first playback time and the second playback time, a time deviation that occurs while editing the first multimedia data at the playback multi-times speed for the first multimedia data;
obtain a third playback time of a second target frame in the second multimedia data, wherein the second target frame is a last one of frames of the first multimedia data that appear the second multimedia data; and
determine, based on the time deviation, the first playback time, the second playback time and the playback multi-times speed, a playback time of the first multimedia data corresponding to each playback time of the second multimedia data after the second playback time and before the third playback time.

10. The electronic device of claim 9, wherein the at least one processor is further configured to:
determine, based on the determined playback time of the first multimedia data, editing frames corresponding to each playback time of the first multimedia data; and
generate, based on the determined editing frames, the second multimedia data.

11. The electronic device of claim 9, wherein the at least one processor is further configured to:

determine the time deviation that occurs while editing the first multimedia data at the playback multi-times speed for the first multimedia data according to the following expression:

$$deviation = time1 - speed \times time2$$

where deviation represents the time deviation, time1 represents the first playback time, time2 represents the second playback time and speed represents the playback multi-times speed.

12. The electronic device of claim 11, wherein the at least one processor is configured to:
   determine the playback time of the first multimedia data corresponding to each playback time of the second multimedia data after the second playback time according to the following expression:

$$moment1 = speed \times moment2 + deviation$$

where moment1 represents the playback time of the first multimedia data and moment2 represents the playback time after the second playback time.

13. The electronic device of claim 9, wherein the at least one processor is configured to:
   obtain a first initial playback time of the first target frame in the second multimedia data after editing;
   in response to the first initial playback time being earlier than a first limit time, determine the second playback time to be equal to the first limit time, wherein the first limit time is a playback time of a beginning frame of the first multimedia data in the second multimedia data; and
   in response to the first initial playback time not being earlier than the first limit time, determine the second playback time to be equal to the first initial playback time.

14. The electronic device of claim 13, wherein the at least one processor is configured to obtain the first limit time according to the following expression:

$$limit1 = time1 - time2/speed$$

where limit1 represents the first limit time, time1 represents the first playback time, time2 represents the second playback time and speed represents the playback multi-times speed.

15. The electronic device of claim 9, wherein the at least one processor is further configured to:
   obtain a second initial playback time of the second target frame in the second multimedia data after editing;
   in response to the second initial playback time being later than a second limit time, determine the third playback time to be equal to the second limit time, wherein the second limit time is a playback time of an end frame of the first multimedia data in the second multimedia data; and
   in response to the second initial playback time not being later than the second limit time, determine the third playback time to be equal to the second initial playback time.

16. The electronic device of claim 15, wherein the at least one processor is further configured to:
   obtain a fourth playback time of the second target frame in the first multimedia data and a duration of the first multimedia data; and
   obtain the second limit time according to the following expression:

$$limit2 = time3 + (duration - time4)/speed$$

where limit2 represents the second limit time, time3 represents the third playback time, duration represents the duration of the first multimedia data, time4 represents the fourth playback time and speed represents the playback multi-times speed.

17. A non-transitory computer-readable storage medium storing computer instructions, wherein the computer instructions are configured to cause a computer to implement a method for determining multimedia editing information, the method comprising:
   obtaining a first playback time of a first target frame in first multimedia data to be edited, obtaining a second playback time of the first target frame for second multimedia data after editing and obtaining a playback multi-times speed set for the first multimedia data, wherein the first target frame is a first one of frames of the first multimedia data that appear in the second multimedia data, and the playback multi-times speed is times of a playback speed of the first multimedia data higher than a regular playback speed;
   determining, based on the first playback time and the second playback time, a time deviation that occurs while editing the first multimedia data at the playback multi-times speed for the first multimedia data;
   obtaining a third playback time of a second target frame in the second multimedia data, wherein the second target frame is a last one of frames of the first multimedia data that appear the second multimedia data; and
   determining, based on the time deviation, the first playback time, the second playback time and the playback multi-times speed, a playback time of the first multimedia data corresponding to each playback time of the second multimedia data after the second playback time and before the third playback time.

* * * * *